United States Patent
Kim

(10) Patent No.: US 6,834,118 B2
(45) Date of Patent: Dec. 21, 2004

(54) APPARATUS AND METHOD FOR RECOGNIZING SELF-POSITION IN ROBOT SYSTEM

(76) Inventor: In-Gwang Kim, #301 Gusam Villa, 223-10 Sangdo 4-Dong, Dongjak-Ku, Seoul (KR)

( * ) Notice: Subject to any disclaimer, the term of this patent is extended or adjusted under 35 U.S.C. 154(b) by 651 days.

(21) Appl. No.: 09/916,340

(22) Filed: Jul. 30, 2001

(65) Prior Publication Data

US 2002/0015521 A1 Feb. 7, 2002

(30) Foreign Application Priority Data

Jul. 28, 2000 (KR) ........................................ 2000-43779

(51) Int. Cl.[7] ................................................ G06K 9/00
(52) U.S. Cl. ........................ 382/153; 382/106; 382/291; 901/47
(58) Field of Search ............................... 382/153, 106, 382/291; 901/46, 47; 701/200, 207, 208, 210, 28; 340/988, 990, 995.25; 348/113, 116, 118

(56) References Cited

U.S. PATENT DOCUMENTS

| | | | | |
|---|---|---|---|---|
| 5,001,635 A | * | 3/1991 | Yasutomi et al. ............. | 701/26 |
| 5,204,814 A | * | 4/1993 | Noonan et al. ............... | 701/25 |
| 5,758,298 A | * | 5/1998 | Guldner ....................... | 701/23 |
| 5,793,934 A | * | 8/1998 | Bauer .......................... | 700/250 |

* cited by examiner

*Primary Examiner*—Bhavesh M. Mehta
*Assistant Examiner*—John Strege
(74) *Attorney, Agent, or Firm*—Piper Rudnick LLP

(57) ABSTRACT

The present invention relates to an apparatus and method for recognizing self-position employing a virtual map divided into directional reflex distance data and cell unit, and a computer-readable recording medium for recording a program containing the method of the invention. The apparatus for recognizing self-position in a robot system includes: a reflex distance detecting unit for outputting a designated signal to each direction obtained by equally dividing 360° as designated, detecting a point where the outputted signal reaches a designated object by using the signal reflected and inputted, and based on the detection result, detecting the distance to the object in each direction; direction detecting unit for providing information of absolute direction; and, controlling unit for controlling general operation of the reflex distance detecting unit and the direction detecting unit, dividing the region on a virtual map into a cell unit to generate directional reflex distance information per cell, and recognizing the present position by comparing the directional reflex distance information of each cell with the directional reflex distance information from the present position of a detected robot.

6 Claims, 4 Drawing Sheets

APPARATUS AND METHOD FOR RECOGNIZING SELF-POSITION IN ROBOT SYSTEM

FIELD OF THE INVENTION

The present invention relates to an apparatus and method for recognizing self-position in a robot system; and, particularly to an apparatus and method for recognizing self-position employing a virtual map divided into directional reflex distance data and cell unit, and a computer-readable recording medium for recording a program containing the method of the invention.

In addition, the present invention is related to self-position recognition technique that has been applied to cleaning robots and robots with artificial intelligence, in which the robots can confirm their positions, based on the inputted data on the construction of a building or a house, using a reflex distance detector that detects 360° directional reflex distance and a highly accurate digital compass.

DESCRIPTION OF THE PRIOR ART

In a conventional method for recognizing self-position in the robot system, there has been employed a camera in order to confirm self-position by recognizing a particular object or a position transmitting marker in order to recognize self-position. However, in the conventional method, there has been a problematic case such that a highly expensive apparatus is needed or self-position recognition per se is not accurate. Especially, the conventional method requires a great deal of calculation for position recognition and there are often errors in the position recognition.

SUMMARY OF THE INVENTION

It is, therefore, an object of the present invention to provide an apparatus and method for more accurately and efficiently recognizing a present self-position in a robot system by comparing directional reflex distance information of every direction a digital compass indicates while rotating a laser distance detector which is served to detect laser reflex distance to 360° direction with directional reflex distance information from substitute cell positions on a predetermined virtual map regarding a building structure.

Another object of the present invention is to provide a computer-readable recording medium that records a program for executing the method described above.

In order to achieve the above-described objects, there is provided an apparatus for recognizing self-position in a robot system, the apparatus includes reflex distance detecting unit for outputting a designated signal to each direction obtained by equally dividing 360° as designated, detecting a point where the outputted signal reaches a designated object by using the signal reflected and inputted, and based on the detection result, detecting the distance to the object in each direction; direction detecting unit for providing information of absolute direction; and controlling unit for controlling general operation of the reflex distance detecting unit and the direction detecting unit, dividing the region on a virtual map into a cell unit to generate directional reflex distance information per cell, and recognizing the present position by comparing the directional reflex distance information of each cell with the directional reflex distance information from the present position of a detected robot.

In accordance with an aspect of the present invention, there is provided a method for recognizing self-position in a robot system, the method comprising the steps of forming a virtual map consisting of a plurality of cells; outputting a designated signal to each direction obtained by equally dividing 360° as designated, and detecting a point where the outputted signal reaches a designated object by using the signal reflected and inputted; detecting distance to the object from each direction based on the detected point from the previous step, and saving the distance in each cell; detecting directional reflex distance information at the present position of the robot; and recognizing the present position of the robot by comparing the directional reflex distance information saved in each cell and the directional reflex distance information at the present position of the robot.

In accordance with another aspect of the present invention, there is provided a computer-readable recording medium storing instructions for executing a method for recognizing self-position in a robot system, the method comprising the steps of: a) forming a virtual map consisting of a plurality of cells; b) outputting a designated signal to each direction obtained by equally dividing 360° as designated, and detecting a point where the outputted signal reaches a designated object by using the signal reflected and inputted; c) detecting distance to the object from each direction based on the detected point from the previous step, and saving the distance in each cell; d) detecting directional reflex distance information at the present position of the robot; and e) recognizing the present position of the robot by comparing the directional reflex distance information saved in each cell and the directional reflex distance information at the present position of the robot.

According to the embodiment of the present invention, a self-position recognizing method in a robot system, a robot unit first forms a two-dimensional virtual map based on the analysis on the construction of a house or a building. The robot unit then divides the region on the virtual map into a minimum number of cells, and figures out directional laser reflex distance information on each direction obtained from equally dividing 360° by designated values around each cell (i.e., 16 directions if 360° is divided by 22.5°, 32 directions if 360° divided by 11.25°). This information on the position of each cell on the virtual map is later used for position information cell to help a robot to recognize self-position while shifting.

In order for a robot to recognize his self-position or utilize the information on the self-position, he seeks for other expected substitute cells by using direction and actual distance he shifted from the present cell, and selecting a closest cell after comparing each directional laser reflex distance information of the present position with that of other substitute cells aforementioned.

The recognition of self-position according to the present invention is very accurate and efficient since it uses absolute directional reflex information. Especially, cell-divided region indicating method related to position information is very advantages and convenient for a cleaning robot without an operator.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

A preferred embodiment of the present invention will now be described with reference to the accompanying Chemical Formulas. The matters defined in the description are nothing but the ones provided to assist in a comprehensive understanding of the invention. Also, well-known functions or constructions are not described in detail since they would obscure the invention in unnecessary detail.

Figure 1:
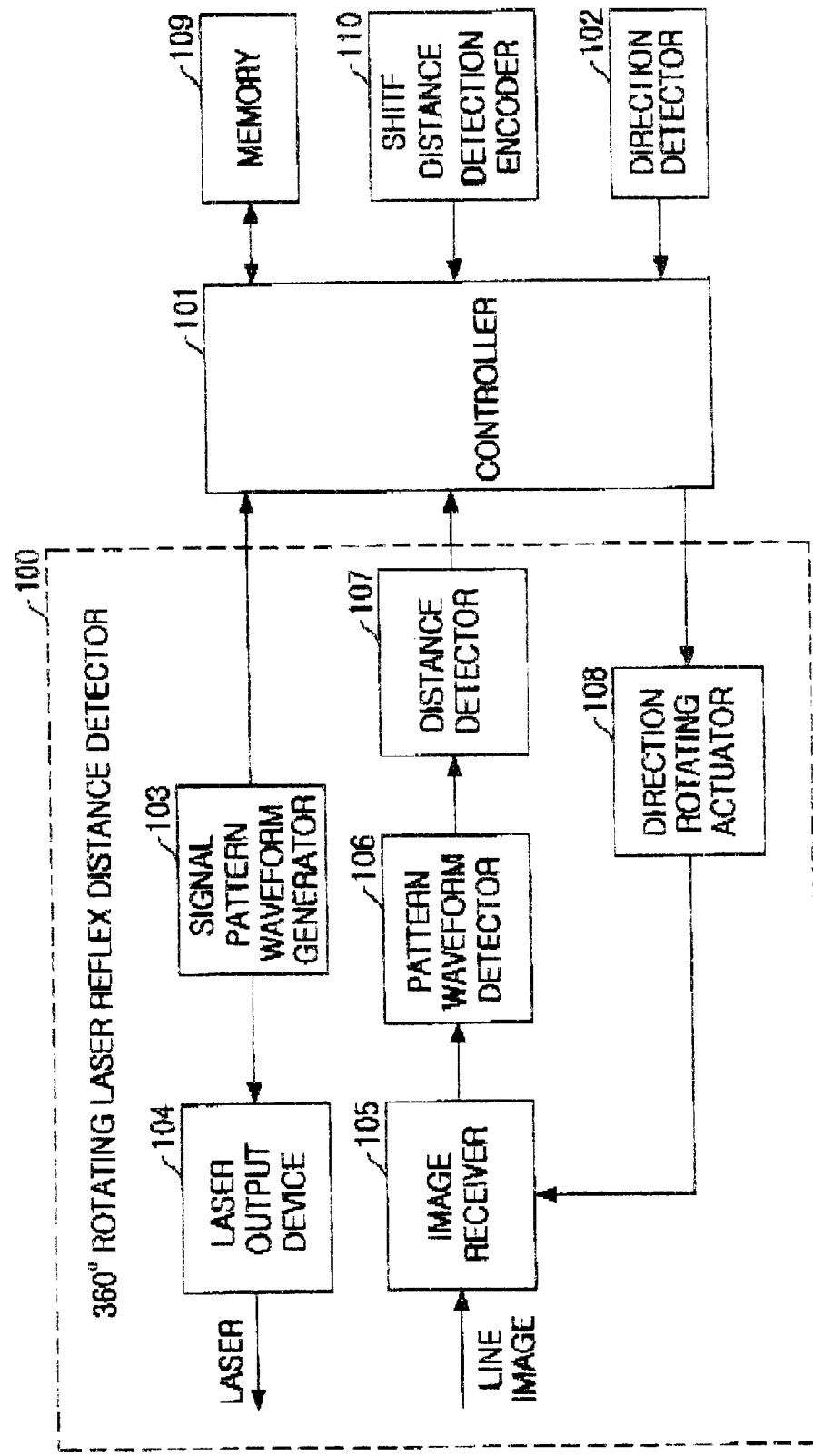
FIG. 1 is a schematic view showing a construction of an apparatus for recognizing self-position in robot system according to a preferred embodiment of the present invention.

FIG. 1 shows a construction of an apparatus for recognizing self-position in robot system according to a preferred embodiment of the present invention.

In FIG. 1, a robot system with an apparatus for recognizing self-position is comprised of a 360° rotating laser reflex distance detector 100 that outputs a laser signal to each direction obtained from dividing 360° by designated value and detecting the distance between an object and a laser point where the laser signal reaches the object by using the inputted line image data from the laser signal reflection, and consequently outputs laser reflex distance information according to each direction; a controller 101 that controls general operation of the self-position recognizing apparatus, divides a region of a virtual map into cell unit, saves the directional laser reflex distance information according to each cell, selects expected substitute cells by using direction and the distance a robot actually shifted from a previous position in a cell, and extracts a closest cell at the result of comparing directional laser reflex distance information at the present position with directional laser reflex distance information of the expected substitute cell in order to use for the present position information of himself; and, a direction detector 102 that provides absolute direction information.

The 360° rotating laser reflex distance detector 100 includes a signal pattern waveform generator 103, which, under the control of the controller 101, generates signal waveform of a corresponding pattern for operating square waves of the designated period Tf as a laser signal for a short period of time. A laser output device 104, according to the signal waveform, takes a laser signal output on-off. The outputted laser signal turns to an image after being reflected by the object, and then is inputted to an image receiver 105.

Image receiver 105 comprises a lens, a line charge couple device (CCD) and A/C (Analog/Digital) converter such that a CCD sensor converts luminosity of foreign light to an electric signal and the converted signal, after A/D conversion, is transmitted to a pattern waveform detector 106. The image receiver 105 is the same with a currently used an image scan circuit of gray level. In addition, the image receiver 105 outputs as much data as the pixel number of CCD device at once through the pattern waveform detector 106, and at that time, sampling speed (Nyquist sampling) is twice faster than the signal waveform frequency (1/Tf) generated by the signal pattern waveform generator 103 in order to calculate a frequency of a receiving waveform based on the sampling values per pixel data of the transmitted image. That is, on the basis of an optional value, if the period of the received waveform is greater than the optional value, '1' is taken, and if smaller, then '0' is taken. Thus, if the changing rate appears to be periodical in a regular interval, the waveform is regarded as a periodical and the period is checked to see if it is Tf. Although it is true that faster sampling speed results more accurate period, in order to find out whether a waveform has a period Tf, the sampling speed should preferably be 2–4 times faster than the frequency (1/Tf). The pattern waveform detector 106 examines whether the period of a data value that changes in each pixel at line image data inputted every sampling speed described above has the period of laser output waveform, i.e., Tf, and detects a corresponding pixel as a laser point.

A distance detector 107 detects the distance between an object and a robot by using a pixel position indicating a laser point on a line image. The mechanism of the distance detector 107 will be explained with reference to a graph showing a principle of detection of laser reflection distance (See FIG. 2).

A direction detector 102 can be a digital compass and provides information about absolute direction that is obtained from equally dividing 360° by a designated value through the controller 101.

A direction rotating acutator 108, depending on the absolute direction information, rotates the laser output device 104 and the image receiver 105 to each direction as described above.

As mentioned before, FIG. 2 is an explanatory graph showing a principle of detection of laser reflection distance. More details are explained with reference to FIG. 1.

Figure 2:
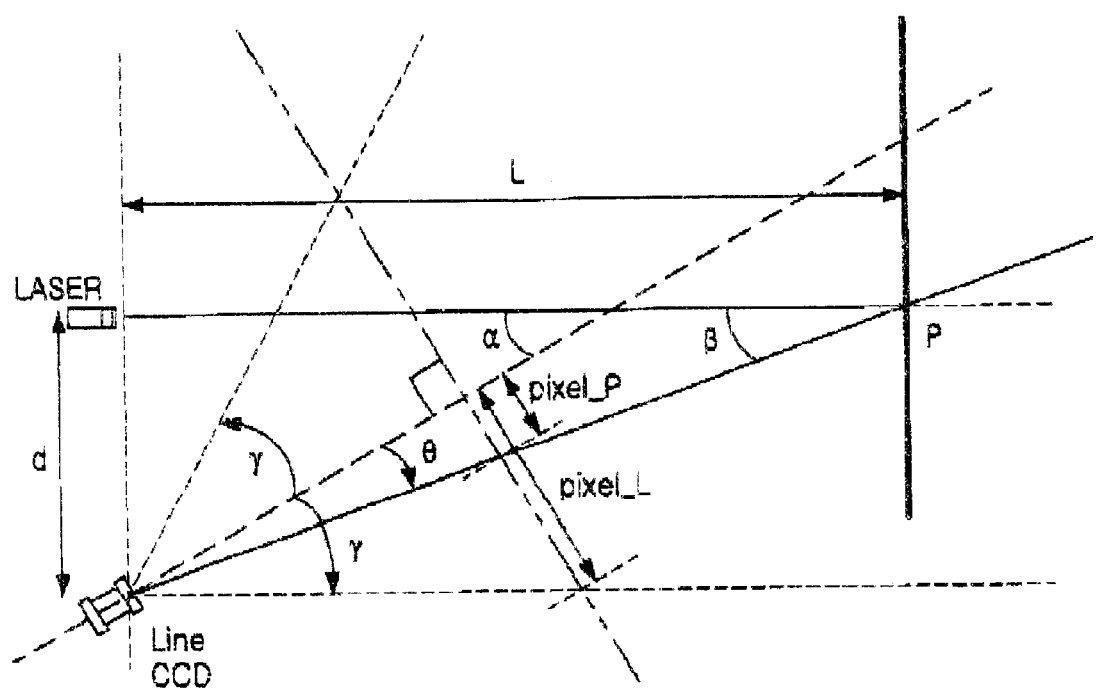
FIG. 2 is an explanatory graph showing a principle of detection of laser reflection distance.

As shown in FIG. 2, the angle between line CCD receiving direction of the laser output device 104 and that of the image receiver 105, respectively, is α, and the distance between the laser output device 104 and the line CCD is d. Laser point P is where a laser signal from the laser output device 104 reaches an object. As explained in FIG. 1, the pattern waveform detector 106 provides the laser point P. The line image for which CCD input is possible ranges an angle of 2α. Within this range, let's suppose that the number of line image for CCD input is twice larger Pixel_L, the distance from the laser output device 104 to the laser point P is L, and CCD central line and the laser point P are at an angle of θ, wherein θ can be calculated by using Pixel_P, an indication of laser point P position from the received line image.

The following equation (1) explains how to calculate the angle (θ) between CCD central line and a laser point P:

$$\tan(\theta) = (\text{PixelP} \div \text{PixelL}) \tan(\gamma) \quad (1)$$

wherein, θ is the angle between a central line of line CCD and a laser point P, and γ is image range 2γ for line CCD input. The Pixcel_L corresponds to the number of image pixel, 2×Pixel_L, for which the line CCD input is possible. The Pixcel_P indicates a pixel position showing the position of a laser point P on a received line image.

However, since β=α−β, and d=L×tan(β) in the <Mathematical Equation 1>, the distance, L, from the laser output device 104 to the laser point P can be calculated through equation (2) as follows:

$$L = d \div \tan(\beta) \quad (2)$$

wherein, L is the distance between a laser output device 104 to a laser point P, d is the distance between the laser output device 104 and line CCD, and β is an angle between the laser output device 104 and the line CCD towards the direction of the laser point P.

According to the present invention, to find substitute cells corresponding to actual positions a robot shifted more quickly, shift direction and distance of the robot are calculated within a corresponding range, for example, within a range of distance component cumulative value ($D_x$, $D_y$) and the expected substitute cells corresponding to a present position are selected.

Figure 3:
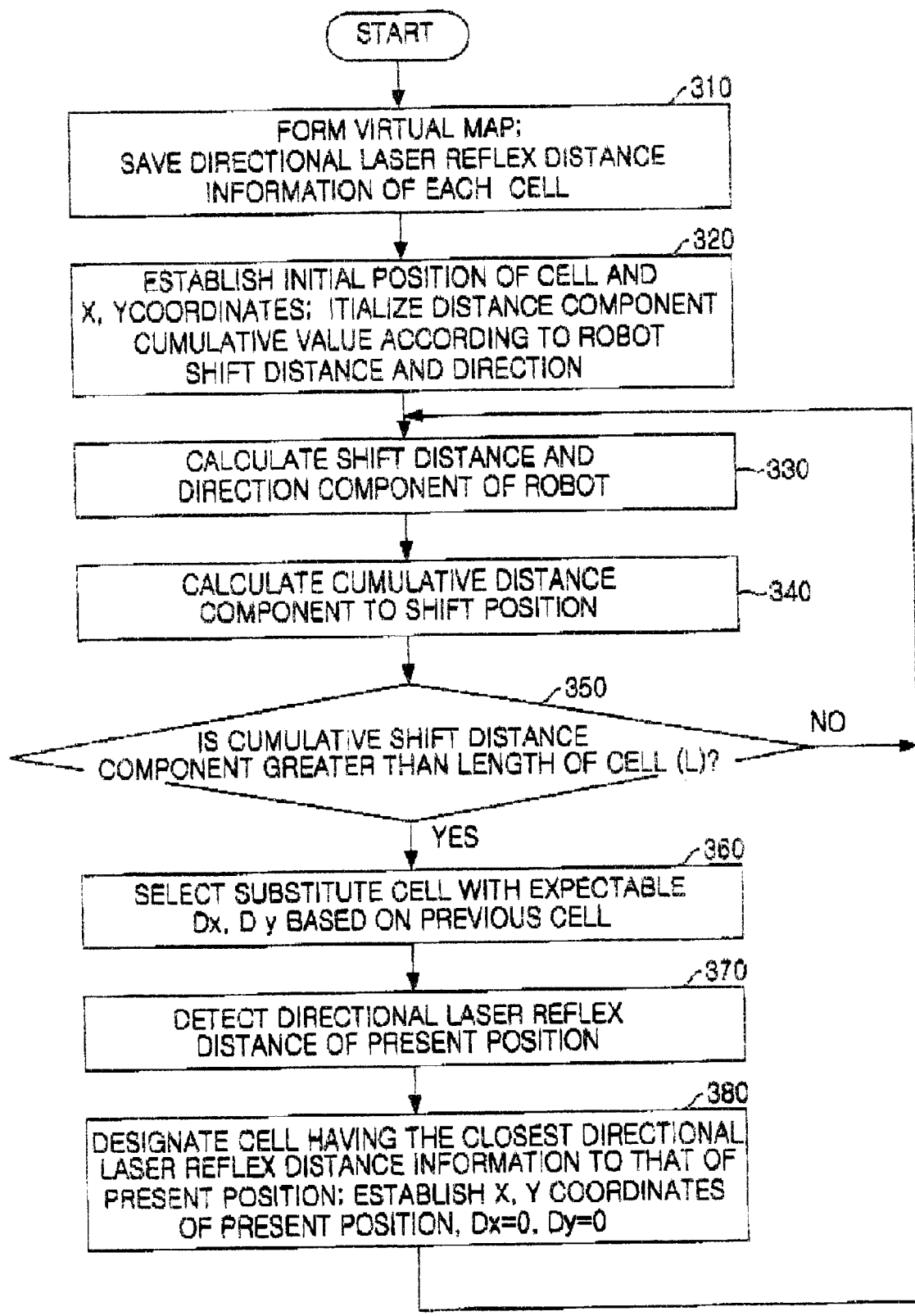
FIG. 3 is a flow chart illustrating a procedure of recognizing self-position in robot system according to the preferred embodiment of the present invention.

FIG. 3 is a flow chart illustrating a procedure of recognizing self-position in robot system according to the preferred embodiment of the present invention. More details are explained with reference to FIGS. 1 and 2.

A controller 101 forms a virtual map based on construction analysis of a robot accomplished by walking around a house or a building initially to analyze construction therein, and saves it into a memory 109. At this time, the controller 101 divides the region on the virtual map into a minimum number of cell units. In addition, the controller 101 controls a direction detector 102 and a rotating reflex distance detector 100, respectively, and saves directional laser reflex distance information according to each cell into a memory 109 at step 310. The controller 101, for self-position recognition, sets up an initial position cell of a robot and initial X, Y coordinates. Also, the controller 101 initializes a distance component cumulative value according to shift distance and direction of the robot (i.e., $D_x$: X-coordinate distance component cumulative value=0, $D_y$: Y-coordinate distance component cumulative value=0) at step 320. Every time the robot shifts for a certain interval, the controller 101, based on direction information provided by a shift distance detection encoder 110 and a shift distance information direction detector 102, calculates a shift distance and direction components of the robot, ($T_x$, $T_y$) at step 330. The controller 110 calculates cumulative distance components from a previous position to a new present position, ($D_x = D_x + T_x$, $D_y = D_x = T_y$) at step 340. Further, the controller 110 examines whether the cumulative shift distance components exceed the length L of a cell ($|D_x| > L$ or $|D_y| > L$?) at step 350. This is to check whether the shift of the robot goes off the previous cell range on the basis of a fixed critical value. If the cumulative shift distance component does not exceed the length L of a cell, the controller 110 repeats the controlling operation starting from the step of 330. On the other hand, if the cumulative shift distance component is greater than the length L of a cell, the controller 110 selects substitute cells around the previous cell, which are corresponding to the present position on condition that the substitute cells are easily expected within a range of a distance component cumulative values ($D_x$, $D_y$) according to shift distance and direction of a robot at step 360.

According to a method for selecting substitute cells of the embodiment of the present invention, a directional distance having the most similar directional laser reflex value is selected from a higher rank, and any cell having the least distance difference from a selected distance value gets first selected. The selecting number of a directional distance value from a highest rank, for example, if the directional distance value exists for 32 directions, only one of the closest directional distance value to optional 16 directions is selected. The above-described method is to adapt surroundings to changes dependent on position changes of a person or other surroundings.

The controller 110 inputs a value of distance between an object and a robot provided by a distance detector 107 and absolute direction information provided by a direction detector 102, and detects a directional laser reflex distance value at a present position at step 370. Then, the controller selects a cell among other substitute cells described above, which has the closest distance value to a directional laser reflex distance information at a present position, and designates the cell as a new present position cell at step 380. Further, the controller 101, based on the absolute direction information from the direction detector 102, establishes a present X, Y coordinates and initializes distance component values ($D_x$, $D_y$) according to shift distance and direction of a robot, and then performs controlling operation from the step 330 at step 390.

Figure 4:
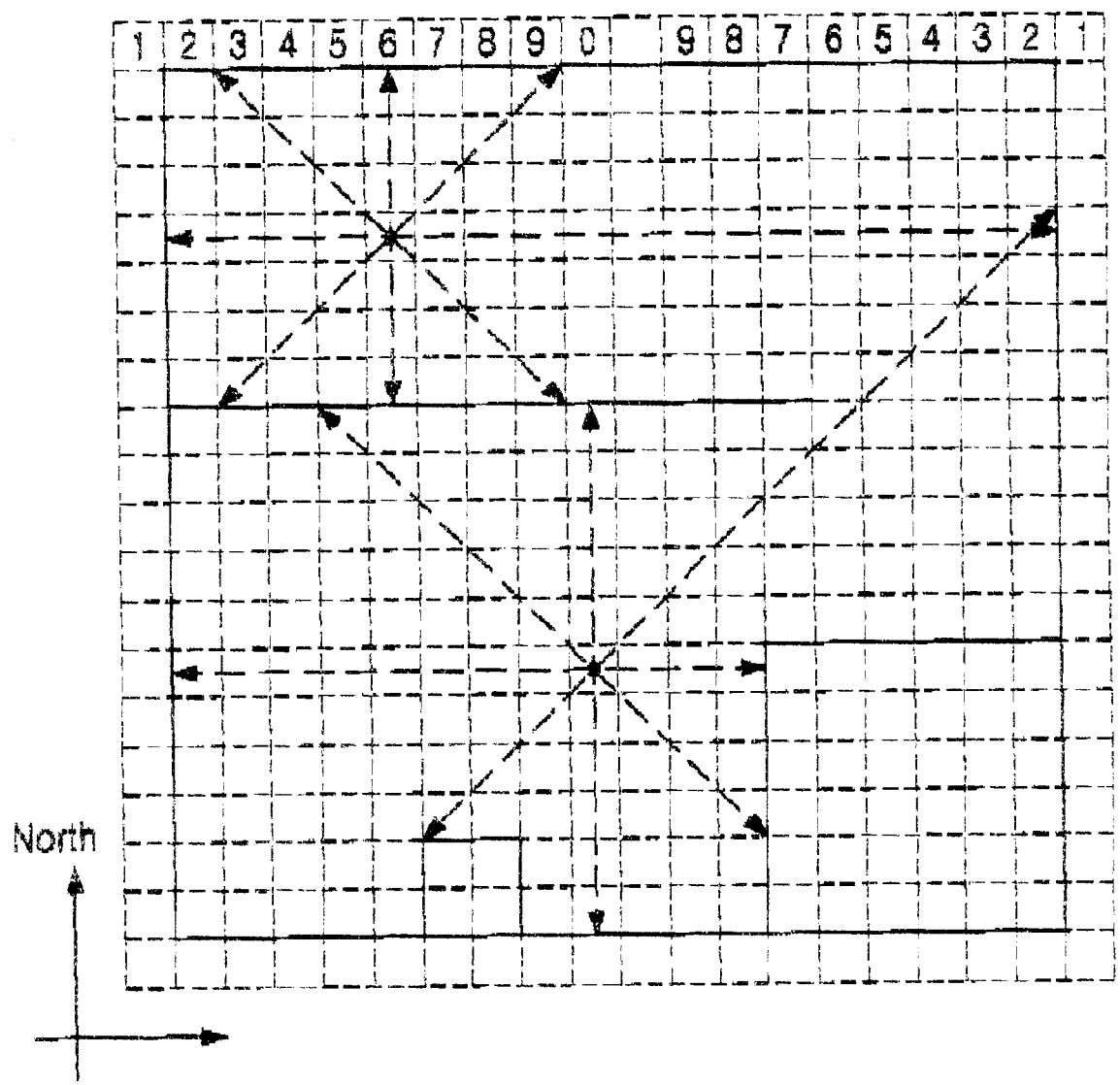
FIG. 4 illustrates a possible virtual map using construction analysis of a robot on an initial building.

FIG. 4 illustrates a possible virtual map using construction analysis of a robot on an initial building.

In the Figure, the distance between directional objects in a cell region that is divided by a designated cell length is shown. Here, directional distance information of cells on 8 directions is illustrated.

The present invention employs laser to obtain directional reflex distance information of cells. However, any reflexive signal, e.g., supersonic waves, can be used also. In fact, when laser is used, despite the fact that supersonic waves are directional, it is often difficult to obtain an accurate distance according to a directional angle because of spreading nature of sonic waves. In addition, since a kind of a square waveform with deviated pulse width is operated as a laser signal for a very short period of time at the time of laser output, the entire energy of light is greatly reduced and thus, it is not harmful for the sight of a person at all.

In conclusion, the present invention provides an accurate and efficient method for recognizing self-position in a robot system by using absolute directional reflex information, and it is very useful for a cleaning robot without an operator by applying cell region indicating method regarding position information to an area the robot cleaned.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recognizing self-position in a robot system, comprising:
    reflex distance detecting means for outputting a designated signal to each direction obtained by equally dividing 360° as designated, detecting a point where the outputted signal reaches a designated object by using the signal reflected and inputted, and based on the detection result, detecting the distance to the object in each direction;
    direction detecting means for providing information of absolute direction;
    saving means for saving information about a cell-unit virtual map and directional reflex distance information of each cell; and
    controlling means for controlling general operation of the reflex distance detecting means and the direction detecting means, generating directional reflex distance information per cell and saving the information into the saving means, and recognizing the present position by comparing the directional reflex distance information of each cell with the directional reflex distance information from the present position of a detected robot.

2. The apparatus as recited in claim 1, further comprising shift distance detecting means for providing information on shift distance of the robot, thereby enabling the controller to calculate shift direction and distance of the robot by using the absolute direction information and the distance information the robot shifted, and comparing directional reflex distance information of substitute cells that are expected within the range calculated with that of a robot at the present position detected.

3. A method for recognizing self-position in a robot system, comprising the steps of:

a) forming a virtual map consisting of a plurality of cells;

b) outputting a designated signal to each direction obtained by equally dividing 360° as designated, and detecting a point where the outputted signal reaches a designated object by using the signal reflected and inputted;

c) detecting distance to the object from each direction based on the detected point from the previous step, and saving the distance in each cell;

d) detecting directional reflex distance information at the present position of the robot; and e) recognizing the present position of the robot by comparing the directional reflex distance information saved in each cell and the directional reflex distance information at the present position of the robot.

4. The method as recited in claim 3, wherein said step e) recognizing includes the steps of:

e1) calculating shift direction and distance by using information on shift distance and absolute direction of the robot;

e2) selecting substitute cells within a range calculated from the calculating step among other directional reflex distance information saved according to each cell; and e3) recognizing a present self-position of a robot by comparing the directional reflex distance information corresponding to selected substitute cells in the selecting step with directional reflex distance information at the present position of the robot detected in the detecting step.

5. A computer-readable recording medium storing instructions for executing a method for recognizing self-position in a robot system, the method comprising the steps of:

a) forming a virtual map consisting of a plurality of cells;

b) outputting a designated signal to each direction obtained by equally dividing 360° as designated, and detecting a point where the outputted signal reaches a designated object by using the signal reflected and inputted;

c) detecting distance to the object from each direction based on the detected point from the previous step, and saving the distance in each cell;

d) detecting directional reflex distance information at the present position of the robot; and e) recognizing the present position of the robot by comparing the directional reflex distance information saved in each cell and the directional reflex distance information at the present position of the robot.

6. The recording medium as recited in claim 5, wherein said step e) recognizing includes the steps of:

e1) calculating shift direction and distance by using information on shift distance and absolute direction of the robot;

e2) selecting substitute cells within a range calculated from the calculating step among other directional reflex distance information saved according to each cell; and e3) recognizing a present self-position of a robot by comparing the directional reflex distance information corresponding to selected substitute cells in the selecting step with directional reflex distance information at the present position of the robot detected in the detecting step.

* * * * *